Figure 1:
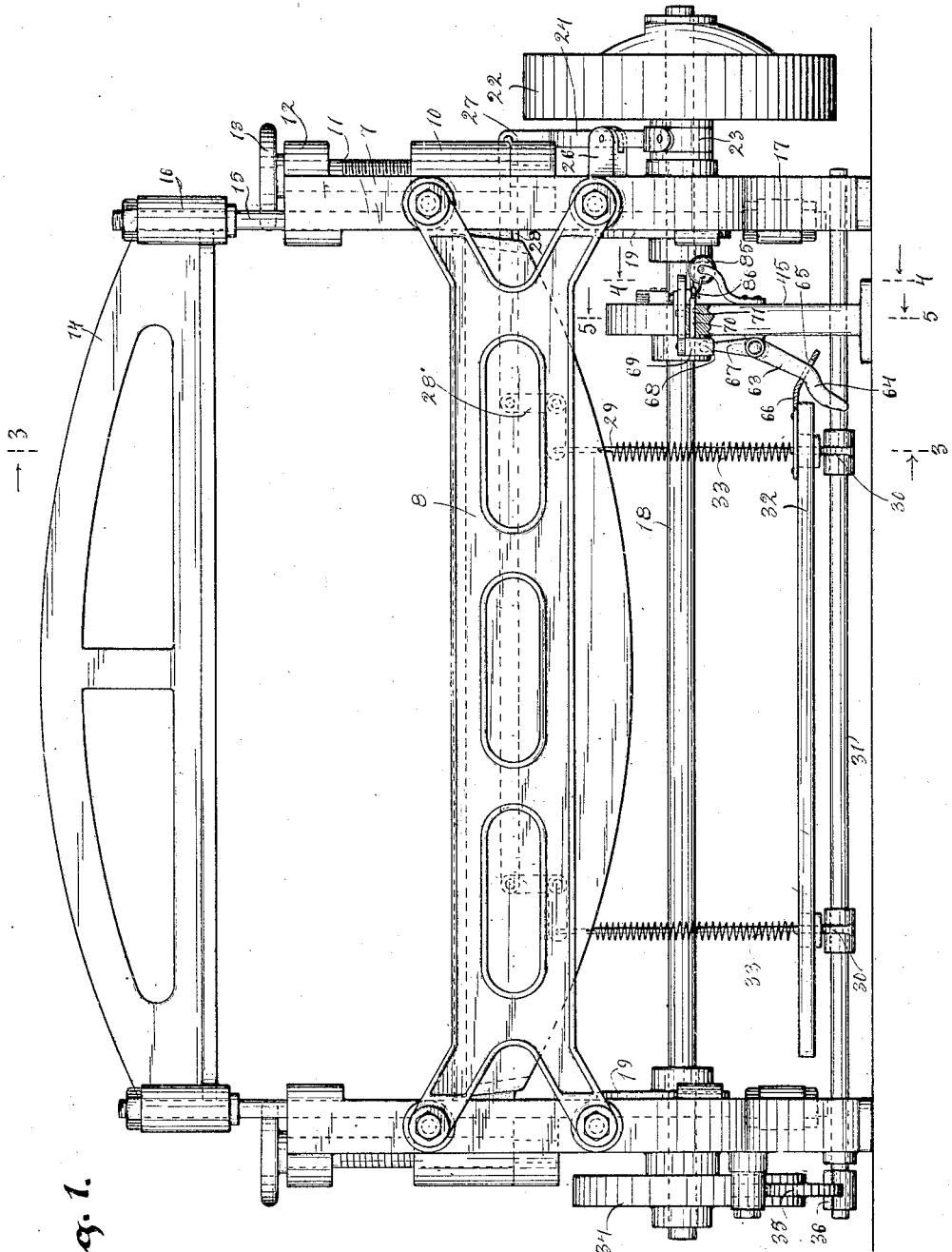

R. SCHWALBACH.
SAFETY DEVICE FOR PRESSES.
APPLICATION FILED JUNE 26, 1916.

1,322,356.

Patented Nov. 18, 1919.
3 SHEETS—SHEET 1.

INVENTOR
Robert Schwalbach

Youell, Keeney & French
ATTORNEYS

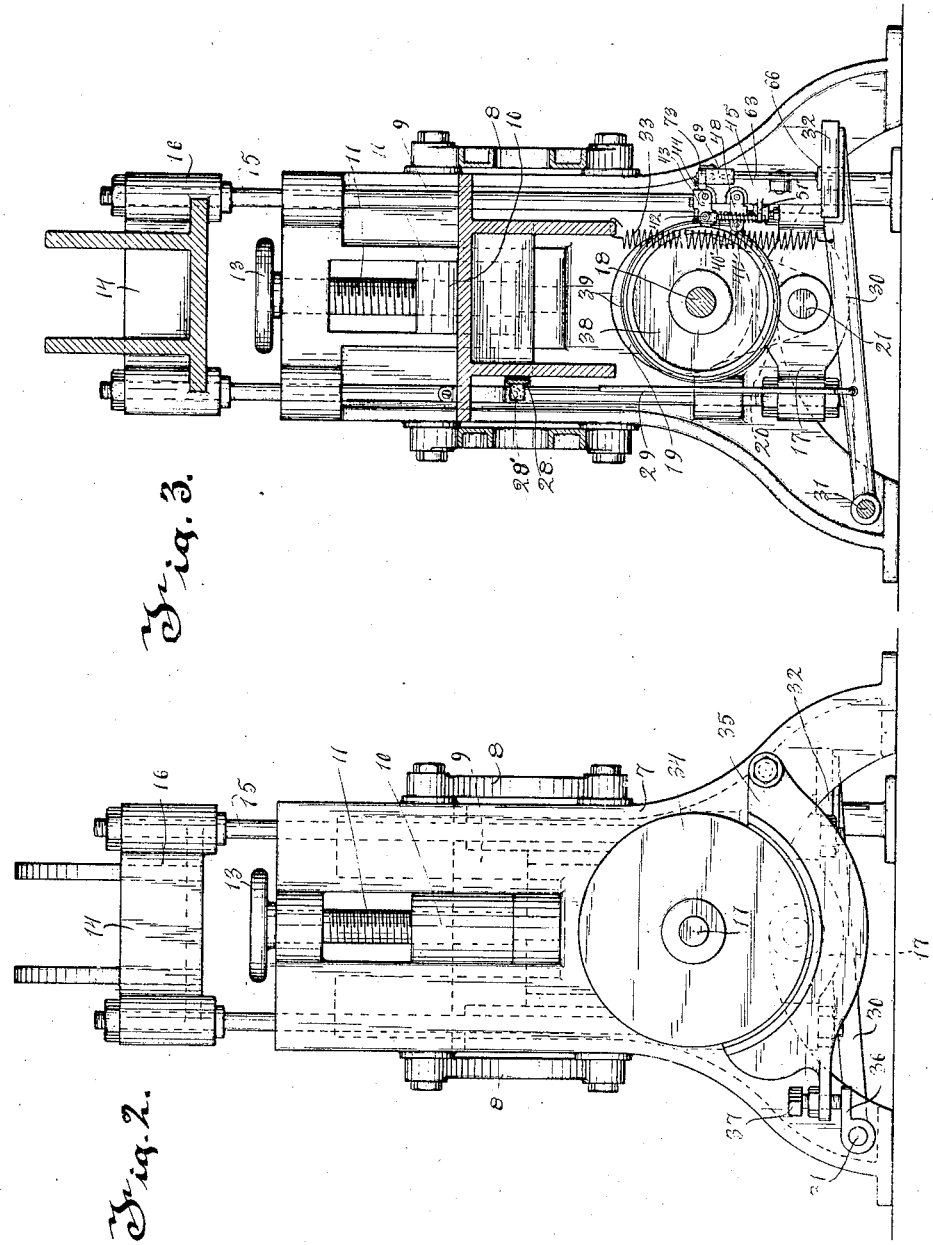

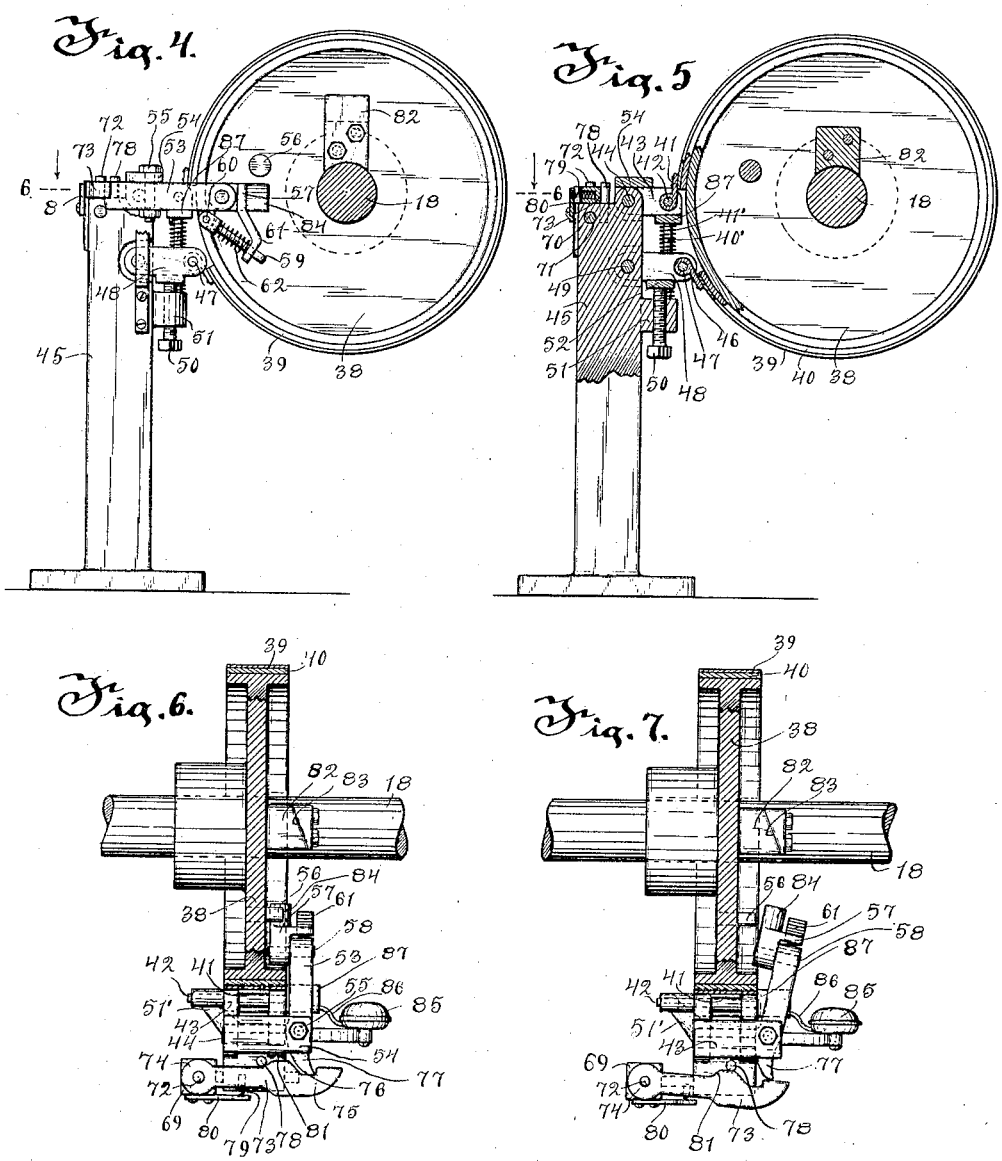

UNITED STATES PATENT OFFICE.

ROBERT SCHWALBACH, OF MILWAUKEE, WISCONSIN, ASSIGNOR TO F. MAYER BOOT & SHOE COMPANY, OF MILWAUKEE, WISCONSIN, A CORPORATION OF WISCONSIN.

SAFETY DEVICE FOR PRESSES.

1,322,356.  Specification of Letters Patent.  Patented Nov. 18, 1919.

Application filed June 26, 1916. Serial No. 105,793.

*To all whom it may concern:*

Be it known that I, ROBERT SCHWALBACH, a citizen of the United States, and resident of Milwaukee, in the county of Milwaukee and State of Wisconsin, have invented new and useful Improvements in Safety Devices for Presses, of which the following is a description, reference being had to the accompanying drawings, which are a part of this specification.

The invention relates to safety devices more particularly for pressing, punching, cutting machines or the like.

The invention is more particularly designed to provide a safety device for punch presses of the die cutting type, such as presses used for cutting leather to form heels and soles for shoes.

Punch presses, for cutting leather for shoes, usually include a pressing beam which is operated through suitable connections by a revoluble shaft. This shaft is connected up to a suitable source of power and a clutch connects the power driving means with said shaft, the clutch being usually controlled by the operator by a connection with a treadle on the machine. When the operator presses down on the treadle he throws in the clutch to connect the revoluble shaft with the driving means so as to operate the presser beam, and on a release of the treadle the clutch is thrown out to disconnect the power means from the revoluble shaft. However, due to the momentum furnished the revoluble shaft by the driving means it is customary to employ a friction brake on these machines which is controlled by the operation of the treadle. In this connection when the operator presses down on the treadle the friction brake is released so as not to impede the operation of the machine and when the operator releases his foot from the treadle the friction brake is operated to stop the shaft simultaneously with the operation of the clutch so as to stop the operation of the machine. However, in machines of this type it sometimes happens that the clutch fails to operate or the friction brake fails to operate with the result that the presser beam descends toward the table and if the operator has his hands on the table between the die and the work he is liable to be injured on the next operation of the presser beam. It also happens in some instances that after one operation of the machine has been made and the operator's hands are between the work and the dies that he may neglect to remove his foot from the treadle with the result that the machine continues to run and the presser beam comes down on the next stroke and crushes his hands between the die and the work. It is the essential object of this invention to prevent the operation of the presser beam, first,—if either the clutch or brake of the machine fails to operate when the operator has released his foot from the treadle, and second,—to prevent the operation of the presser beam after it has made one stroke if the operator neglects to take his foot from the treadle.

I am aware that various devices have been made to remedy the difficulties experienced in presses of the type described but most of these are designed to bring the operating shaft to an abrupt stop with a consequent jar and a liability of breakage of parts of the machine whereas the present invention embodies a brake band which is gradually but surely applied to stop the operation of the press.

The invention is further designed to provide a safety device for stopping the drive of a revoluble shaft whose operation is controlled through treadle operated means.

The invention further designs to provide a new and improved safety device for presses and the like.

The invention consists in the several features hereinafter set forth and more particularly defined by claims at the conclusion hereof.

In the drawings Figure 1 is a view of a device embodying the invention showing it applied to the machine, parts being shown in section and parts being broken away; Fig. 2 is an end view of the machine upon which the safety device is used; Fig. 3 is a section taken on the line 3—3 of Fig. 1; Fig. 4 is a section taken on the line 4—4 of Fig. 1, parts being broken away; Fig. 5 is a section taken on the line 5—5 of Fig. 1, parts being shown in section; Fig. 6 is a section taken on the line 6—6 of Fig. 4 showing the device in normal position before the treadle is operated; Fig. 7 is a view similar to Fig. 6 showing the device in position after the treadle is operated.

Before describing the safety device, a brief description of the type of machine to which it may be applied will be given.

The machine to which the device is principally applicable is a punch press and in the present instance I have shown a form of punch press of usual construction for cutting out heels and soles for shoes. The machine comprises uprights 7 connected across by brace bars or plates 8 bolted to them, and a table 9 whose ends 10 are adjustably mounted upon said uprights by means of threaded rods 11 which pass through the upper ends 12 of the uprights and engage in the threaded apertures in the ends 10, said rods being provided with hand wheels 13 whereby the position of the table may be adjusted to different heights. A pressing beam or member 14 has a pair of rods 15 secured to each of its ends 16 and these rods pass through the uprights 7 to the table 9 and are connected across at their lower ends in pairs by cross bars 17. Means are provided for raising and lowering the rods 15 and consequently the pressing beam 14. This means comprises a revoluble shaft 18 journaled in bearings in the uprights 7 and having eccentrics 19 mounted thereon, eccentric straps 20 mounted on each of said eccentrics and pivotally secured at their lower ends to the cross bars 17 by pins 21 journaled in said bars, and means for driving said shaft. This driving means consists of a pulley 22 loosely mounted on the shaft 18 which may be connected up by a belt, not shown, to any suitable source of power and a friction clutch of usual construction, the collar 23 of which is shown, is used to secure the pulley 22 to the shaft to drive the same. Controlling means are also provided for shifting the friction clutch into and out of engagement with the pulley 22 comprising a lever 24 operatively connected at one end to the collar 23 and pivotally secured intermediate its ends to a bracket 26 secured to one upright 7 and pivotally secured at its other end 27 to one end of a link 28 which is pivotally secured at its other end to one end of a bell crank lever 28', pivotally mounted on the frame, and which bell crank is pivotally secured to a link rod 29 which is pivotally secured at its lower end to one of the treadle levers 30 pivotally mounted at one end to a rod 31 mounted in the uprights and which has a treadle platform 32 mounted on its free end and the movement of the treadle is restrained in one direction by springs 33 secured to it and to the machine.

In machines of this construction the shifting of the clutch from operative to inoperative position will not prevent the rotation of the shaft 18 due to its momentum and consequently these machines are generally provided with a friction brake consisting of a brake wheel 34 mounted on the shaft 18 at one end of the machine and a brake shoe 35 pivotally connected at one end to the upright 7 adjacent the wheel 34 and adapted to be thrown into or out of frictional engagement with said wheel. The brake shoe being pivotally connected at one end its weight normally tends to keep it out of engagement with the wheel 34 and means controlled by the treadle are provided for bringing said shoe into engagement with said wheel. This means consists of an arm 36 mounted on the treadle shaft 31 and adapted to engage an adjustable stop 37 mounted on the free end of the shoe when the treadle is in normal position, Fig. 2.

The operation of the machine is as follows:—

The operator places the material to be cut upon the table 9 and places his cutting die in proper position upon the material. On a downward movement of the treadle 32, the friction clutch, through the lever 30, link 29, lever 28' link 28, lever 27 and collar 23, is brought into engagement with the pulley 22 to lock said pulley to the revoluble shaft 18 to rotate the same. At the same time depression of the treadle 32 moves the arm 36 downwardly and consequently the brake shoe 35 out of engagement with the brake wheel 34. The rotation of the shaft 18 causes the eccentrics 19 to rotate which, through the eccentric straps 20, pin 21, cross bars 17, raises and lowers the presser beam 14 which on its downward movement presses upon the dies and forces them through the material to cut it. On the release of the treadle the springs 33 move it upwardly which movement will through the linkage previously described, shift the friction clutch to stop the rotation of the revoluble shaft 18 and which movement will also bring the brake shoe 35 into engagement with the wheel 34 to stop the rotation of the shaft 18 due to its momentum.

On the machines of the character above described it sometimes happens that through the carelessness of the operator or the improper operation of the friction clutch or the friction brake, the clutch or brake do not perform their functions and the pressing beam rises and falls a second time with serious injury to the operator.

To obviate any possibility of injury to the operator through the continued operation of the machine, due to inefficient working parts or to the operator's carelessness, I have provided a safety device which stops the machine from performing its operation after the cut has been made.

This device consists of a brake disk or wheel 38 on the horizontally disposed shaft 18 and brake band 39 surrounding the wheel, and means controlled by the operation of the controlling means, or treadle, for bringing the brake band into engagement with the disk 38 on the shaft 18 to prevent the rotation of said shaft and consequently the operation of the machine, should the operator through carelessness neglect to take his foot off the treadle after the cut has been made, or should the clutch or brake on the machine itself fail to operate.

The brake band 39 is provided with a brake lining 40 and is pivotally secured at one end 41 upon a pin 42 on a vertically moving yoke 43 which is pivotally secured by a pin 44 to a support 45. The other end 46 of the brake band 39 is pivotally secured to a pin 47 mounted in arms of a yoke 48 which is mounted on a pin 49, pivotally mounted in said support 45. The yoke 48 is held relatively immovable by an adjustable stud 50 mounted in a lug 51 on support 45 and upon which the transverse portion 52 of the yoke 48 rests. The position of the member 48 may be adjusted by adjusting the stud 50 with respect to the lug 51 so that the lower end 46 of the brake band may be brought into closer or looser engagement with the brake disk 38. The end 41 of the brake band is normally held out of engagement with the disk 38 by a spring 40' mounted on a rod 41' pivotally connected at one end to the pin 42 of the yoke member 43 and slidably mounted at its lower end in the lug 51' on the support 45, the spring 40' being mounted on the rod between the yoke 43 and the lug 51', Fig. 3. The end 46 being held relatively immovable the brake is applied by providing means for swinging the yoke 43 downwardly to move the end 41 of the band downwardly to thereby tighten the band upon the disk 38.

This means for swinging the yoke 43 consists of a stop lever 53 horizontally pivotally mounted intermediate its ends to the transverse portion 54 of the yoke 43 by a bolt 55 and provided with means at its forward end for engaging a stop pin 56 mounted in the disk 38. While this means for engaging the stop pin 56 might be simply an inwardly projecting end of the stop lever 53 I prefer to pivotally mount a vertically movable stop finger 57 upon a pin 58 in the member 53 and provide a yielding connection between said finger 57 and the member 53. This yielding connection consists of a rod 59 pivotally connected at its enlarged rear end 60 to the member 53 and slidably mounted at its forward end in an arm 61 depending from the finger 57, and a coiled spring 62 is mounted on the rod 59 between its rear end and the arm 61 so that when the pin 56 strikes the stop 57 and moves it downwardly it will compress the spring 62 while the yoke 43 is moving downwardly and thus gradually apply the brake.

The operation of the stop lever 53 during one revolution of the shaft 18 is under the control of the treadle through means now to be described. This means consists of a trip lever 63 pivotally mounted intermediate its ends upon bearings upon the support 45 and slidably mounted at its lower end 64 in a slot 65 in a bracket 66 secured to the treadle platform 32. The upper end 67 of the lever 63 has a ball and socket joint connection 68 with a slide 69 provided with a pin 70 slidably mounted in an aperture 71 in the support 45. The slide 69 is provided with an upstanding pivot pin 72 upon which a latch 73 is pivotally mounted at one end 74. The free end 75 of said latch 73 is provided with a notch 76 for engaging the rear end 77 of the lever 53. The latch 73 normally bears against a pin 78 and is held in engagement with the lever 53 through a spring connection 79 between it and a bracket 80 secured to a slide 69. The latch 73 is also provided with a cam surface 81 on the side adjacent the pin 78 so that on the engagement of the pin with the cam surface the latch 73 will be moved out of engagement with the stop lever 53. In the construction of the stop operating means just described when the treadle 32 is depressed the plate 66 thereon engages the end 64 of the lever 63 and moves it inwardly thus moving the end 67 outwardly and thus moving the latch 73 outwardly which in turn through its connection with the stop member, which includes lever 53, finger 57 and their associated parts, moves said stop outwardly, as shown in Fig. 7, and thus moves the stop out of the engagement with the pin 56 and permits the machine to operate during one revolution of the shaft 18 but on the next revolution of said shaft means are provided for automatically moving the stop member into the path of movement of the pin 56 irrespective of the operation of the treadle. This automatic operating means consists of a stop setting member 82 securely bolted to the side of the stop disk 38 on the same side as the pin 56 and provided with a cam surface 83 which is adapted to engage a cam surface 84 on the stop finger 57 when the stop member has been moved outwardly to allow the pin 56 to pass by for one revolution of the shaft 18. As soon as the pin 56 has passed by, the setting member 82 moves the stop member back into the path of the pin so that on the next revolution of the shaft the pin will strike the stop and through the pivoted yoke member 43 apply the brake.

The stop setting member 82 is so positioned upon the disk 38 with reference to the shaft 18 that under ordinary conditions when the machine is running properly it will not be brought into engagement with the stop finger to operate the safety device before the throwing out of the clutch and the application of the friction brake.

In order that the operator may know that there is something the matter with the machine I have provided an alarm to be used in connection with the safety device. This alarm consists of the usual mechanically operated alarm bell 85, such as a bicycle bell carried by an arm secured to the upright 45 and provided with an oscillatory lever 86 for operating the same, which lever is adapted to project below and in the path of the transverse portion 87 on the yoke member 43 so that when the yoke is depressed on the application of the safety device it will move the lever 86 to sound the alarm, Figs. 1, 6 and 7.

The operation of the safety device is as follows:

The operator presses down on the treadle 32 to operate the friction clutch to cause the machine to make the cut as previously described. On the downward movement of the treadle 32, the bracket 66 engages the end 64 of the lever 63 pushing it to the right and thereby moving the slide 69 and latch 73 connected thereto to the left causing the cam 81 on the latch to ride on the pin 78 and move outwardly against the action of the spring 79, Figs. 1 and 7. Under these conditions the notched end 75 of the latch, normally in engagement with the end 77 of the stop lever 53, moves said lever 53 causing the stop finger 57 to move outwardly out of the path of the pin 56. The drive shaft 18 then makes one revolution but during this revolution the stop member is moved back into the path of the pin 56 by the stop-setting member 82. Under ordinary conditions the safety device will not operate because, when the operator takes his foot off the treadle, the upward movement of the treadle will throw out the friction clutch and apply the friction brake and thus stop the machine. If however the operator neglects to take his foot off the treadle after the first revolution of the shaft 18 or if the clutch and brake on the machine fail to operate then the shaft 18 will continue to operate and the stop member being in the path of the pin 56 will be struck by said pin with the result that the yoke member 43 to which the stop member is connected and forms an operative part will be swung downwardly thus moving the end 41 of the brake band 39 downwardly and through the yielding connection between the stop finger 57 and stop lever 53 gradually tighten the brake band 39 about the brake wheel 38 and stop the rotation of the shaft and consequently the operation of the machine without jarring the parts thereof and prevent the beam 14 from descending a second time and thus prevent any liability of injury to the operator. As soon as the safety brake is applied, the alarm is rung, as previously described, and if the operator himself has not been careless he will know that the friction clutch or friction brake of the machine are not working properly and may proceed to have it repaired so as to prevent any injury.

The invention thus exemplifies a means for preventing the operation of the machine if the operator through carelessness fails to release the treadle after the first stroke, and for preventing the operation of the machine if the friction clutch and friction brake on the machine fail to operate.

What I claim as my invention is:

1. In a machine of the class described, the combination, with a driving member, a revoluble member, a clutch for connecting said members, a treadle for operating said clutch and a brake controlled by the treadle for stopping said revoluble member on a release of the treadle, of an emergency band brake for the revoluble member, and means for automatically applying said band brake to said revoluble member after a definite limited movement thereof, when the member reaches such limit of movement.

2. In a machine of the class described, the combination with a driving member, a revoluble member, a clutch for connecting said members, a treadle for operating said clutch and a brake controlled by the treadle for stopping said revoluble member on a release of the treadle, of an emergency band brake for said revoluble member, and means for automatically and gradually applying said band brake to said revoluble member after a definite limited movement thereof, when the member reaches such limit of movement.

3. In a machine of the class described, the combination, with a driving member, a revoluble member, a clutch for connecting said members, a treadle, and connections between said treadle and clutch for operating said clutch on every actuation of the treadle, of a brake wheel on the revoluble member, a brake band for engaging said wheel, a stop on the brake wheel, and a stop member operatively connected to said brake band and to said treadle, independent of said treadle and clutch connections and adapted to be thrown into the path of movement of said stop on the brake wheel to automatically apply said brake to said revoluble member, after a definite limited movement thereof, when the member reaches such limit of movement.

4. In a machine of the class described, the combination, with a driving member, a revoluble member, a clutch for connecting said members, a treadle, and connections between said treadle and clutch for operating said clutch on every actuation of the treadle, of a break wheel on the revoluble member, a brake band for engaging said wheel, a stop in the brake wheel, and a yielding stop member operatively connected to said brake band and adapted to be thrown into the path of movement of said stop on the brake wheel to automatically and gradually apply said brake to said revoluble member after a definite limited movement thereof, when the member reaches such limit of movement.

5. In a machine of the character described, the combination, with a driving member, a revoluble member, a clutch for connecting said members, means for operating said clutch on every actuation of the machine, and a brake controlled by said clutch operating means for stopping said revoluble member when said members are disconnected, of a band brake for the revoluble member, and means for applying said band brake to prevent more than a single actuation of said revoluble member should said first named brake fail to stop said revoluble member.

6. In a machine of the character described, the combination, with a driving member, a clutch for connecting said members, means for operating said clutch on every actuation of the machine, and a brake controlled by said clutch operating means for stopping said revoluble member when said members are disconnected, of a band brake for the revoluble member, and means for applying said band brake to prevent more than a single actuation of said revoluble member should said first named brake fail to stop said revoluble member, said means comprising a stop on the revoluble member, a stop member operatively connected to said brake band, and means for projecting said stop member into the path of movement of said stop on the revoluble member on every actuation of said clutch operating means.

7. In a machine of the class described, the combination, with a driving member, a revoluble member, a clutch for connecting said members, means for operating said clutch on every actuation of the machine, and a brake controlled by said clutch operating means for stopping said revoluble member when said members are disconnected, of a band brake for the revoluble member, and means for applying said band brake to prevent more than a single actuation of the revoluble member should said first named brake fail to stop said revoluble member, said means comprising a stop on the revoluble member, a yielding stop member operatively connected to said band brake, and menas for projecting said stop member into the path of movement of said stop on the revoluble member on every actuation of said clutch operating means.

8. In a machine of the class described, starting and stopping mechanism comprising, in combination, a clutch through which connections may be effected with a source of power, a brake, means for connecting and disconnecting said clutch and applying said brake to stop the machine, and an emergency band brake controlled by said means and independent of the first named brake for automatically applying said emergency brake after a definite limited movement of the clutch, when the clutch reaches such limit of movement, and said means operating only in case said first named brake fails to stop the machine.

9. In a machine of the class described, driven mechanism, driving means, and starting and stopping mechanism comprising, in combination, a clutch through which connection may be effected between said driven mechanism and said driving means, a brake, means for controlling said clutch and brake, and an emergency band brake for automatically applying said band brake after a definite limited movement of the machine, when the machine reaches such limit of movement, and said band brake operating only in case said first named brake fails to stop the machine.

10. In a machine of the class described, the combination with a driving member, a driven member, a clutch for connecting said members, a treadle for operating said clutch, a brake for said driven member, of a brake wheel on the driven member, a brake band for engaging said wheel, a stop on the brake wheel, and a two-part stop member operatively connected to said brake band, the parts of said stop member being yieldingly connected together, said stop member being adapted to be moved by the treadle out of the path of said stop on the brake wheel to permit the brake wheel to rotate when the treadle is actuated to start the machine and adapted to be moved out of the path of movement of said stop to apply said brake band in case the clutch or brake fails to operate.

11. In a machine of the class described, the combination of a driving member, a revoluble member, a cluch for connecting said members, a brake for stopping said revoluble member, a treadle for operating said clutch, of a brake wheel on the revoluble member, a brake band for operating said wheel, a means for applying said brake band to said wheel comprising a stop on the brake wheel, a pivotally mounted brake lever operatively connected to said brake band, a stop finger yieldingly connected to said brake lever, and means operatively connected to said clutch operating means for moving said stop finger out of the path of said stop on the brake wheel to permit the brake wheel to rotate when the treadle is actuated to start the machine and adapted to be moved back into path of movement of said stop to apply the brake band in case the first named brake fails to stop said revoluble member.

12. The combination, with a driving means, driven mechanism including a driven shaft, means for starting and stopping said mechanism, a controlled means for said starting and stopping mechanism, of an emergency brake comprising a brake wheel on said driven shaft, a brake band for engaging said wheel, a stop on the brake wheel, a support, a stop lever pivotally connected to said support and operatively connected to said brake band, and a stop finger yieldingly connected to said stop lever and adapted to be moved by the control means out of the path of said stop on the brake wheel to permit the brake wheel to rotate when the control means are actuated to start the machine.

13. The combination, with driving means, driven mechanism including a driven shaft, means for starting and stopping said mechanism and control means for said stopping and starting mechanism, of an emergency brake comprising a brake wheel on said driven shaft, a brake band for engaging said wheel, a stop on the brake wheel, a support, a stop lever pivotally connected to said support and pivotally connected to said brake band, a stop finger yieldingly connected to said stop lever and adapted to be moved by the control means out of the path of said stop on the brake wheel when the control means are actuated to start the machine, and means on said brake wheel and adjacent the stop thereon and adapted to engage said stop lever and move the stop finger back into the path of movement of the stop on the brake wheel irrespective of the operation of said control means, substantially as described.

In testimony whereof, I affix my signature.

ROBERT SCHWALBACH.